United States Patent
Oyamada

(10) Patent No.: US 12,056,147 B2
(45) Date of Patent: Aug. 6, 2024

(54) ANALYSIS DEVICE, ANALYSIS METHOD, AND ANALYSIS PROGRAM

(71) Applicant: NEC Corporation, Tokyo (JP)

(72) Inventor: Masafumi Oyamada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/925,516

(22) PCT Filed: May 21, 2020

(86) PCT No.: PCT/JP2020/020144
§ 371 (c)(1),
(2) Date: Nov. 15, 2022

(87) PCT Pub. No.: WO2021/234916
PCT Pub. Date: Nov. 25, 2021

(65) Prior Publication Data
US 2023/0195746 A1   Jun. 22, 2023

(51) Int. Cl.
*G06F 16/00* (2019.01)
*G06F 16/25* (2019.01)

(52) U.S. Cl.
CPC .................... *G06F 16/258* (2019.01)

(58) Field of Classification Search
CPC .............. G06F 16/258; G06N 5/022
See application file for complete search history.

(56) References Cited

U.S. PATENT DOCUMENTS

| | | | | |
|---|---|---|---|---|
| 7,644,357 | B2* | 1/2010 | Aoyama | H03M 7/00 715/249 |
| 2005/0080755 | A1* | 4/2005 | Aoyama | G06F 16/258 |
| 2020/0409951 | A1* | 12/2020 | Kowolenko | G06F 40/30 |

FOREIGN PATENT DOCUMENTS

| | | | |
|---|---|---|---|
| JP | H08-077010 A | | 3/1996 |
| JP | 2005-070913 A | | 3/2005 |
| JP | 2007-241901 A | | 9/2007 |
| JP | 2007241901 A | * | 9/2007 |
| JP | 2008-310650 A | | 12/2008 |
| WO | 2018/025706 A1 | | 2/2018 |

OTHER PUBLICATIONS

JP Office Action for JP Application No. 2022-524810, mailed on Oct. 3, 2023 with English Translation.
International Search Report for PCT Application No. PCT/JP2020/020144, mailed on Aug. 18, 2020.

* cited by examiner

*Primary Examiner* — Jared M Bibbee

(57) ABSTRACT

The conversion rule storage means 75 stores multiple conversion rules for converting one or more meanings of data to other one or more meanings of data. The analysis means 76 derives, based on one or more given meanings of data and the conversion rules, information indicating what kind of analysis can be performed using the data with the meaning.

4 Claims, 14 Drawing Sheets

FIG. 5

```
BMI CALCULATION:
"HEIGHT" "WEIGHT" → "BMI"
```

```
AGE ESTIMATION:
"GENDER" "HEIGHT" → "AGE"
```

```
CANCER RISK PREDICTION:
"BMI" "AGE" → "CANCER RISK"
```

```
ANNUAL INCOME ESTIMATION:
"GENDER" "AGE" → "ANNUAL INCOME"
```

```
INSURANCE CALCULATION:
"CANCER RISK" "AGE" "GENDER" → "INSURANCE"
```

```
GENDER ESTIMATION:
"PURCHASE HISTORY" → "GENDER"
```

ANALYSIS DEVICE, ANALYSIS METHOD, AND ANALYSIS PROGRAM

This application is a National Stage Entry of PCT/JP2020/020144 filed on May 21, 2020, the contents of all of which are incorporated herein by reference, in their entirety.

TECHNICAL FIELD

This invention relates to an analysis device, an analysis method, and an analysis program for analyzing what kind of analysis can be performed when meanings of data are given.

BACKGROUND ART

PTL 1 describes a device that can derive latent targets with high accuracy by combining sequence analysis and decision tree analysis. The device described in PTL 1 inputs time-series data, and also inputs rules specific to the specific attribute data occurrence set. The device then processes data that has same time-series transition as a rule that has a positive correlation with the specific attribute data occurrence trend, and processes data that has same time-series transition as a rule that has a negative correlation with the specific attribute data non-occurrence trend.

In addition, PTL 2 describes a technique for estimating a meaning of data stored in a column for each column of a table when the table containing data is inputted. Here, "meaning of data" is a concept that the data represents. Each column is assigned a column name. However, since column names are generally determined by humans, there are notational fluctuations in the column names. For example, the column name of a column that stores the gender of a person can be assigned various column names, such as "type", "male/female", and so on. As mentioned above, the "meaning of data" is the concept that the data represents, and is distinct from the column name. In the above example, "gender" corresponds to the meaning of data.

CITATION LIST

Patent Literature

PTL 1: Japanese Patent Application Laid-Open No. 2005-70913
PTL 2: International Publication No. 2018/025706

SUMMARY OF INVENTION

Technical Problem

In general, there are holders who have a lot of data. Examples of such holders include, for example, various stores. However, such holders are not limited to stores.

Although the holders have a lot of data, they often do not know what kind of analysis can be performed with the data.

Therefore, it is an object of the present invention to provide an analysis device, an analysis method, and an analysis program that can derive information indicating what kind of analysis can be performed using the data in one's possession.

Solution to Problem

The analysis device according to the present invention includes conversion rule storage means for storing multiple conversion rules for converting one or more meanings of data to other one or more meanings of data; and analysis means for deriving, based on one or more given meanings of data and the conversion rules, information indicating what kind of analysis can be performed using the data with the meaning.

The analysis method according to the present invention is implemented by a computer including conversion rule storage means for storing multiple conversion rules for converting one or more meanings of data to other one or more meanings of data, wherein the analysis method includes: deriving, based on one or more given meanings of data and the conversion rules, information indicating what kind of analysis can be performed using the data with the meaning.

The recording medium according to the present invention is a computer-readable recording medium in which an analysis program is recorded, wherein the analysis program causes a computer including conversion rule storage means for storing multiple conversion rules for converting one or more meanings of data to other one or more meanings of data to execute: an analysis process of deriving, based on one or more given meanings of data and the conversion rules, information indicating what kind of analysis can be performed using the data with the meaning.

Advantageous Effects of Invention

According to the invention, it is possible to derive information indicating what kind of analysis can be performed using the data in one's possession.

BRIEF DESCRIPTION OF DRAWINGS

FIG. 5 It depicts a schematic diagram showing an example of conversion rules.

DESCRIPTION OF EMBODIMENTS

Example embodiments of the present invention is described below with reference to the drawings.

Figure 1:
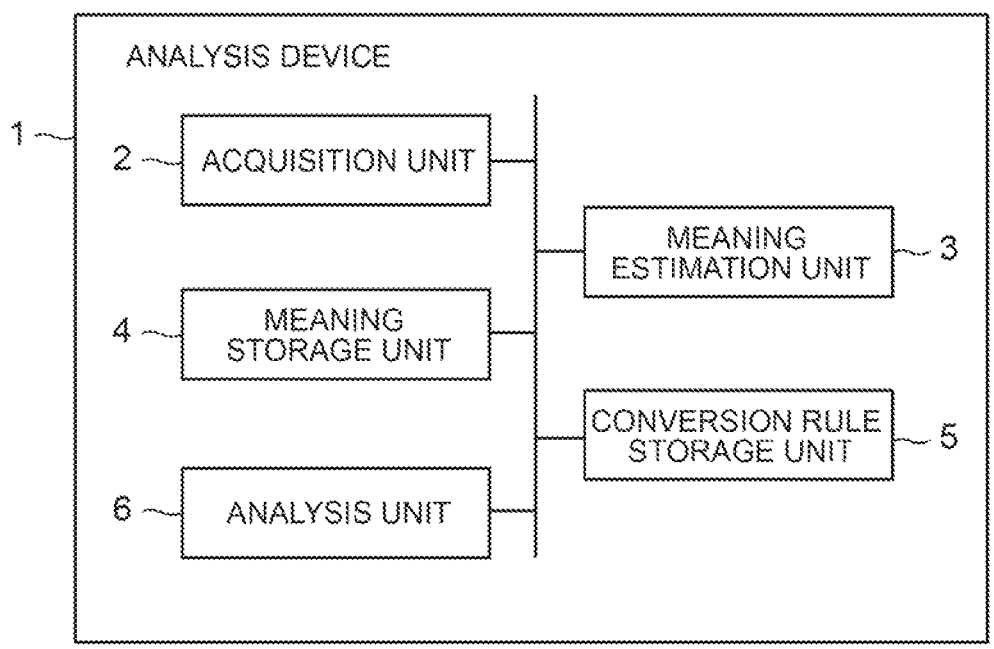
FIG. 1 It depicts a block diagram showing an example of an analysis device of the first example embodiment of the present invention.

FIG. 1 is a block diagram showing an example of an analysis device of the first example embodiment of the present invention. The analysis device 1 of the present example embodiment includes an acquisition unit 2, a meaning estimation unit 3, a meaning storage unit 4, a conversion rule storage unit 5, and an analysis unit 6.

The acquisition unit 2 acquires data possessed by a holder who has a lot of data. For the sake of simplicity of explanation, an example of a case in which the acquisition unit 2 acquires a table that stores data is used. The table contains one or more columns, and data is stored in each column.

The data possessed by the holder who has data may include data purchased by that person from others.

The acquisition unit 2 may be realized by a data reading device that reads a table recorded on a data recording medium such as an optical disk, for example, but acquisition unit 2 is not limited to such a data reading device. For example, the acquisition unit 2 may be realized by a communication interface that receives a table distributed via a communication network.

The meaning estimation unit 3 estimates a meaning of data for each of the various groups of data acquired by the acquisition unit 2. In the present example embodiment, the case in which the meaning estimation unit 3 estimates the meaning of data stored in a column for each column of the table acquired by the acquisition unit 2 will be used as an example. The number of the meanings of data to be estimated by the meaning estimation unit 3 is one or more. The method by which the acquiring unit 2 estimates the meaning of data may be any known method. For example, the meaning estimation unit 3 may estimate the meaning of data stored in each column, for each column, using the method described in PTL 2. The various meanings of data estimated by the meaning estimation unit 3 may be said to be the "meaning of data" given by the person having the data.

The meaning estimation unit 3 stores the various "meanings of data" obtained by estimation in the meaning storage unit 4. For example, when the meaning estimation unit 3 obtains "height", "weight", "annual income", "age", etc. as the meanings of data through estimation, the meaning estimation unit 3 stores those meanings of data in the meaning storage unit 4.

The meaning storage unit 4 is a storage device that stores the meaning of data.

The conversion rule storage unit 5 is a storage device that stores a plurality of conversion rules. A "conversion rule" is a rule for converting one or more meanings of data into one or more other meanings of data. Here, "converting one or more meanings of data into one or more other meanings of data" means that "based on data having a certain meaning, data having another meaning can be calculated or estimated". In addition, each individual conversion rule has a predefined conversion rule ID (identification information of the conversion rule).

Figure 2:
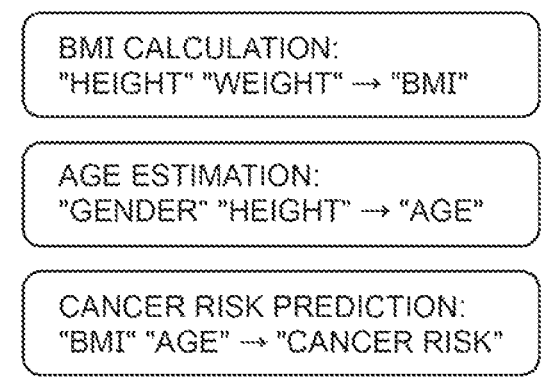
FIG. 2 It depicts a schematic diagram showing an example of conversion rules.

FIG. 2 is a schematic diagram showing an example of conversion rules. FIG. 2 shows three conversion rules. For example, the first conversion rule shown in FIG. 2 represents converting the meaning of data "height" and the meaning of data "weight" into the meaning of data "BMI (Body Mass Index)". This indicates that data with the meaning of "BMI" can be calculated based on data with the meaning of "height" and data with the meaning of "weight". In addition, the conversion rule ID "BMI CALCULATION" is defined for this conversion rule.

In the first conversion rule shown in FIG. 2, "height" and "weight" correspond to the "meaning of data" before conversion, and "BMI" corresponds to the "meaning of data" after conversion. When the conversion rules are represented schematically using arrows as shown in FIG. 2, in the example shown in FIG. 2, the left side of the arrow indicates the "meaning of data" before conversion, and the right side of the arrow indicates the "meaning of data" after conversion. Therefore, for convenience, the meaning of data before conversion may be referred to as the meaning of data on the left side, and the meaning of data after conversion may be referred to as the meaning of data on the right side.

FIG. 2 shows the case in which there are multiple meanings of data on the left side (meaning of data before conversion) in each conversion rule, but the number of meanings of data on the left side may be one in a conversion rule. In FIG. 2, the case in which the number of meanings of data on the right side (meanings of data after conversion) is one in each conversion rule is shown, but there may be multiple meanings of data on the right side in a conversion rule. The existence of multiple meanings of data on the right side means that multiple types of data can be obtained based on the meaning of data on the left side.

In the following explanation, when the conversion rule ID is expressed as "r", all the meanings of data corresponding to the left side may be expressed as "r.input_semantics". Similarly, all the meanings of data corresponding to the right side may be expressed as "r.output_semantics". For example, in the first conversion rule shown in FIG. 2, "BMI CALCULATION.input_semantics" is {"height", "weight"} and "BMI CALCULATION.output_semantics" is {"BMI"}.

Each conversion rule is provided, for example, by a service provider of analysis processing or a data seller, and is stored in the conversion rule storage unit 5 in advance.

Based on the meaning of data obtained by the meaning estimation unit 3 and each conversion rule, the analysis unit 6 derives information indicating what kind of analysis can be performed using the data with the meaning. In the present example embodiment, the analysis unit 6 derives as this information a set of conversion rules extracted recursively starting from the meaning of data obtained by the meaning estimation unit 3.

As mentioned above, the various meanings of data estimated by the meaning estimation unit 3 may be said to be the "meaning of data" given by the person having the data. Therefore, the meaning of data estimated by the meaning estimation unit 3 may hereinafter be referred to as the given meaning of data.

The analysis unit 6 extracts conversion rules that satisfy the condition that the meaning of data on the left side (meaning of data before conversion) is encompassed by the given meaning of data. Then, the analysis unit 6 obtains the union set of the meaning of data on the right side (meaning of data after conversion) in each of the extracted conversion rules and the given meaning of data, and considers the union set as the given meaning of data. Analysis unit 6 repeats this operation.

When the newly extracted conversion rules are identical to the previously extracted conversion rules, then the analysis unit 6 defines the set of newly extracted conversion rules as information indicating what kind of analysis can be performed.

The meaning estimation unit 3 and the analysis unit 6 are realized, for example, by a CPU (Central Processing Unit) of a computer operating according to an analysis program. For example, the CPU can read the analysis program from a program storage device or other program storage medium of the computer and operate as the meaning estimation unit 3 and the analysis unit 6 according to the analysis program.

The meaning storage unit 4 and the conversion rule storage unit 5 are realized, for example, by a storage device of the computer.

Figure 3:
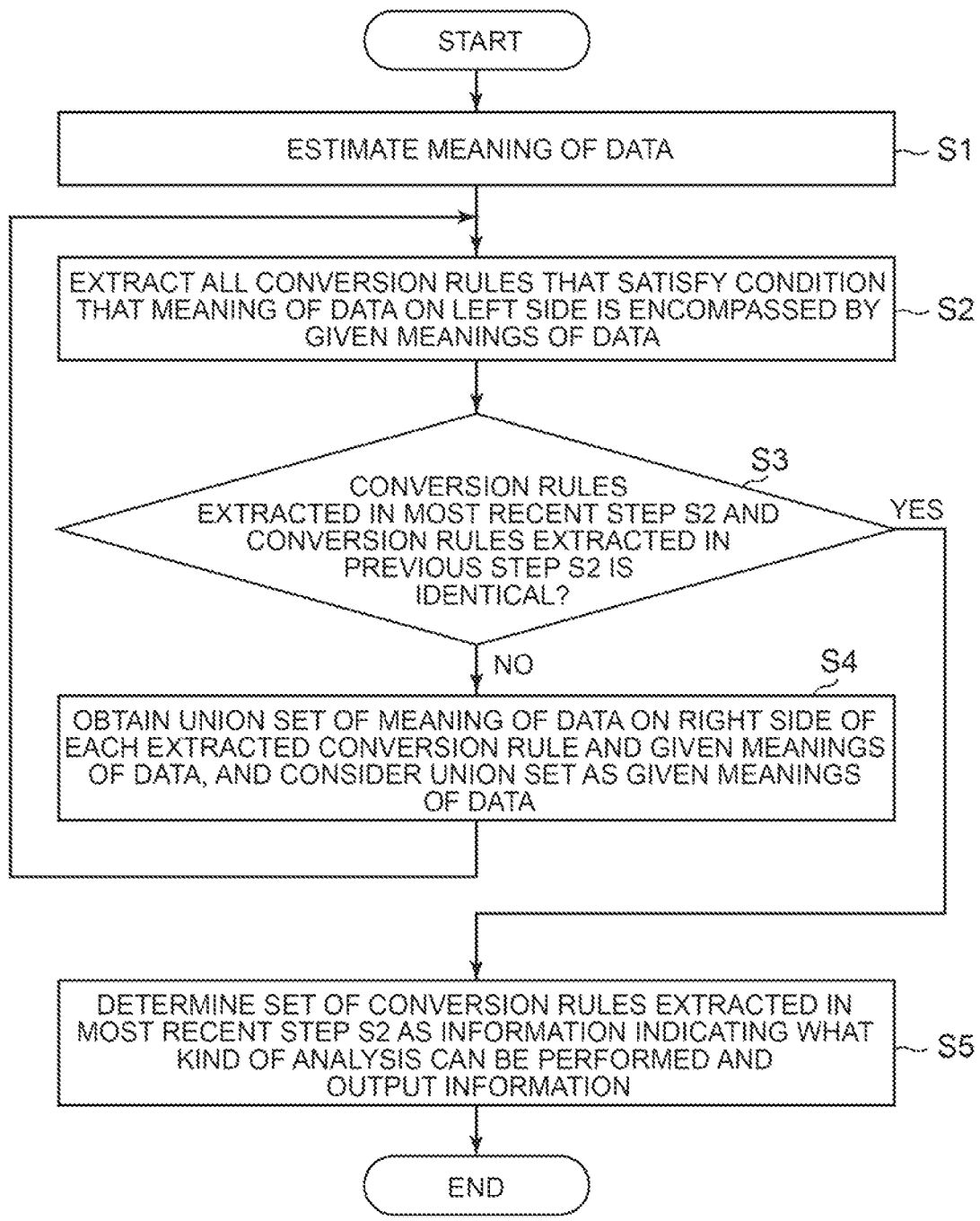
FIG. 3 It depicts a flowchart showing an example of the processing flow of the first example embodiment.

Next, the processing flow of the first example embodiment is described. FIG. 3 is a flowchart showing an example of the processing flow of the first example embodiment. It is assumed that the acquisition unit 2 has acquired the data (table). For simplicity of explanation, it is also assumed that the conversion rule storage unit 5 stores the three conversion rules shown in FIG. 2. In addition, a detailed explanation of the matters already explained will be omitted.

First, the meaning estimation unit 3 estimates the meaning of data acquired by the acquisition unit 2 (step S1). For each column of the table, the meaning estimation unit 3 estimates the meaning of data stored in the column. In step S1, one or more meanings of data are obtained. In this example, it is assumed that "height", "weight", "annual income", and "age" are obtained as the meanings of data. Hereafter, the meaning of data obtained in step S1 will be referred to as the given meaning of data. The meaning estimation unit 3 stores the given meanings of data ("height", "weight", "annual income", and "age") in the meaning storage unit 4.

After step S1, the analysis unit 6 extracts all conversion rules that satisfy the condition that the meaning of data on the left side (meaning of data before conversion) is encompassed by the given meanings of data (step S2). In this example, the given meanings of data are {"height", "weight", "annual income", "age"}. The meaning of data on the left side of the conversion rule "BMI CALCULATION" shown in FIG. 2 is {"height", "weight"}. Therefore, the meaning of data on the left side of the conversion rule "BMI CALCULATION" is encompassed by the given meanings of data. Therefore, since the conversion rule "BMI CALCULATION" satisfies the above condition, the analysis unit 6 extracts the conversion rule "BMI CALCULATION".

As for the conversion rule "AGE ESTIMATION" shown in FIG. 2, "gender" is not encompassed by the given meanings of data. Similarly, for the conversion rule "CANCER RISK PREDICTION", "BMI" is not encompassed by the given meanings of data. Therefore, the conversion rules "AGE ESTIMATION" and "CANCER RISK PREDICTION" are not extracted.

Next to step S2, the analysis unit 6 determines whether the conversion rules extracted in the most recent step S2 and the conversion rules extracted in the previous step S2 is identical (Step S3). When both are not identical (No in step S3), the process moves to step S4. When both are identical (Yes in step S3), the process moves to step S5. At the time of the first transition to step S3, step S2 has been performed only once, so the process moves to step S4. Therefore, the transition is now made to step S4.

In step S4, the analysis unit 6 obtains the union set of the meaning of data on the right side of each extracted conversion rule (meaning of data after conversion) and the given meanings of data, and considers the union set as the given meanings of data. The analysis unit 6 then stores the given meanings of data in the meaning storage unit 4.

In this example, the meaning of data on the right side of the extracted conversion rule "BMI CALCULATION" is {"BMI"}. Therefore, the analysis unit 6 obtains {"height", "weight", "annual income", "age", "BMI"} as the union set of {"BMI"} and the given meanings of data {"height", "weight", "annual income", "age"}. The analysis unit 6 then considers the union set {"height", "weight", "annual income", "age", "BMI"} as the given meanings of data. Furthermore, the analysis unit 6 stores {"height", "weight", "annual income", "age", "BMI"} in the meaning storage unit 4.

After step S4, the analysis unit 6 repeats the process from step S2 onward. in the second step S2, the given meanings of data are {"height", "weight", "annual Income", "age", "BMI" }. Therefore, the analysis unit 6 extracts the conversion rule "BMI CALCULATION" and the conversion rule "CANCER RISK PREDICTION" (see FIG. 2).

Next, the analysis unit 6 performs step S3 again. The conversion rules extracted in the most recent step S2 are the conversion rule "BMI CALCULATION" and the conversion rule "CANCER RISK PREDICTION". The conversion rule extracted in the previous step S2 is only the conversion rule "BMI CALCULATION". Therefore, since both are not identical (No in step S3), the process moves to step S4.

In the most recent step S2, the meanings of the right sides of the extracted two conversion rules are "BMI" and "cancer risk", respectively. Therefore, in step S4, the analysis unit 6 obtains {"height", "weight", "annual income", "age", "BMI", "cancer risk"} as the union set of {"BMI", "cancer risk"} and the given meanings of data {"height", "weight", "annual income", "age", "BMI"}. Then, the analysis unit 6 considers the union set {"height", "weight", "annual income", "age", "BMI", "cancer risk"} as the given meaning of data (Step S4). Furthermore, the analysis unit 6 stores {"height", "weight", "annual income", "age", "BMI", "cancer risk"} in the meaning storage unit 4.

After step S4, the analysis unit 6 performs step S2 for the third time. At this time, the given meaning of data is {"weight", "weight", "annual income", "age", "BMI", "cancer risk"}. Therefore, the analysis unit 6 extracts the conversion rule "BMI CALCULATION" and the conversion rule "CANCER RISK PREDICTION" (see FIG. 2).

Next, the analysis unit 6 performs step S3 again. At this time, the conversion rules extracted in the most recent step S2 are the conversion rule "BMI CALCULATION" and the conversion rule "CANCER RISK PREDICTION". The conversion rules extracted in the previous step S2 are also the conversion rule "BMI CALCULATION" and the conversion rule "CANCER RISK PREDICTION". Therefore, since both are identical (Yes in step S3), the process moves to step S5.

In step S5, the analysis unit 6 determines the set of conversion rules extracted in the most recent step S2 as information indicating what kind of analysis can be performed and outputs the information (Step S5). In this example, the analysis unit 6 determines the set of conversion rules consisting of the conversion rule "BMI CALCULATION" and the conversion rule "CANCER RISK PREDICTION" as information indicating what kind of analysis can be performed.

In step S5, the analysis unit 6 may, for example, display the information on a display device (not shown) provided in the analysis device 1. However, the display is an example of an output mode, and the analysis unit 6 may output the information in other ways. This is the same in the other example embodiments described below.

In the first example embodiment, the analysis unit 6 extracts, in step S2, all the conversion rules that satisfy the condition that the meaning of data on the left side is encompassed by the given meanings of data. In other words, it can be said that the conversion rules extracted in step S2 represent the analysis that can be performed using the data with the given meaning. Furthermore, in the first example embodiment, the number of the given meanings of data is increased by obtaining the union set in step S4 and considering the union set as the given meaning of data. As a result, in the repeated process of steps S2 to S4, as the number of repetition increases, the number of conversion rules extracted in step S2 also increases. Since the analysis unit 6 performs the repeated process of steps S2 to S4 until the conversion rules extracted in step S2 are no longer changed, the analysis unit 6 can extract as many conversion rules as possible that represent the analysis that can be performed using the data with the given meaning. Thus, according to the present example embodiment, it is possible to present what kind of analysis can be performed using the data in the user's possession.

Example Embodiment 2

Figure 4:
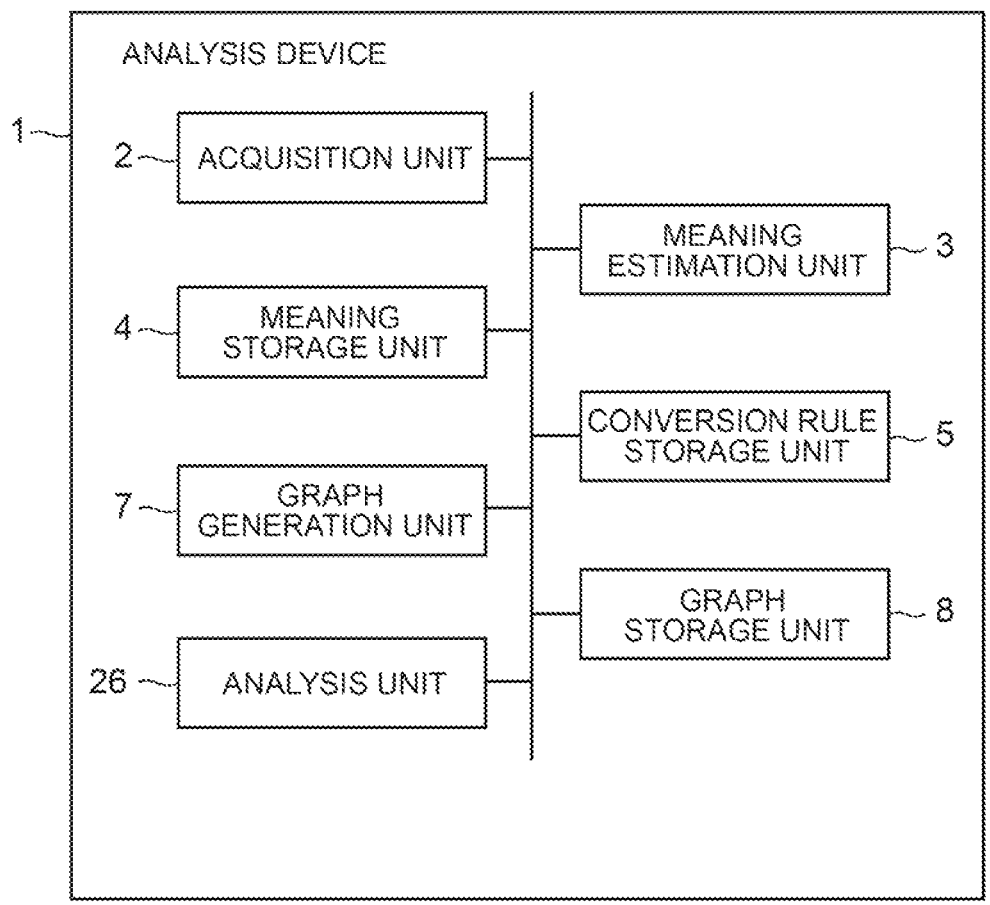
FIG. 4 It depicts a block diagram showing an example of an analysis device of the second example embodiment of the present invention.

FIG. 4 is a block diagram showing an example of an analysis device of the second example embodiment of the present invention. The analysis device 1 of the present example embodiment includes an acquisition unit 2, a meaning estimation unit 3, a meaning storage unit 4, a conversion rule storage unit 5, a graph generation unit 7, a graph storage unit 8, and an analysis unit 26.

The acquisition unit 2, the meaning estimation unit 3, the meaning storage unit 4, and conversion rule storage unit 5 in the second example embodiment are the same as the acquisition unit 2, the meaning estimation unit 3, the meaning storage unit 4, and the conversion rule storage unit 5 in the first example embodiment, and the explanation is omitted.

Figure 6:
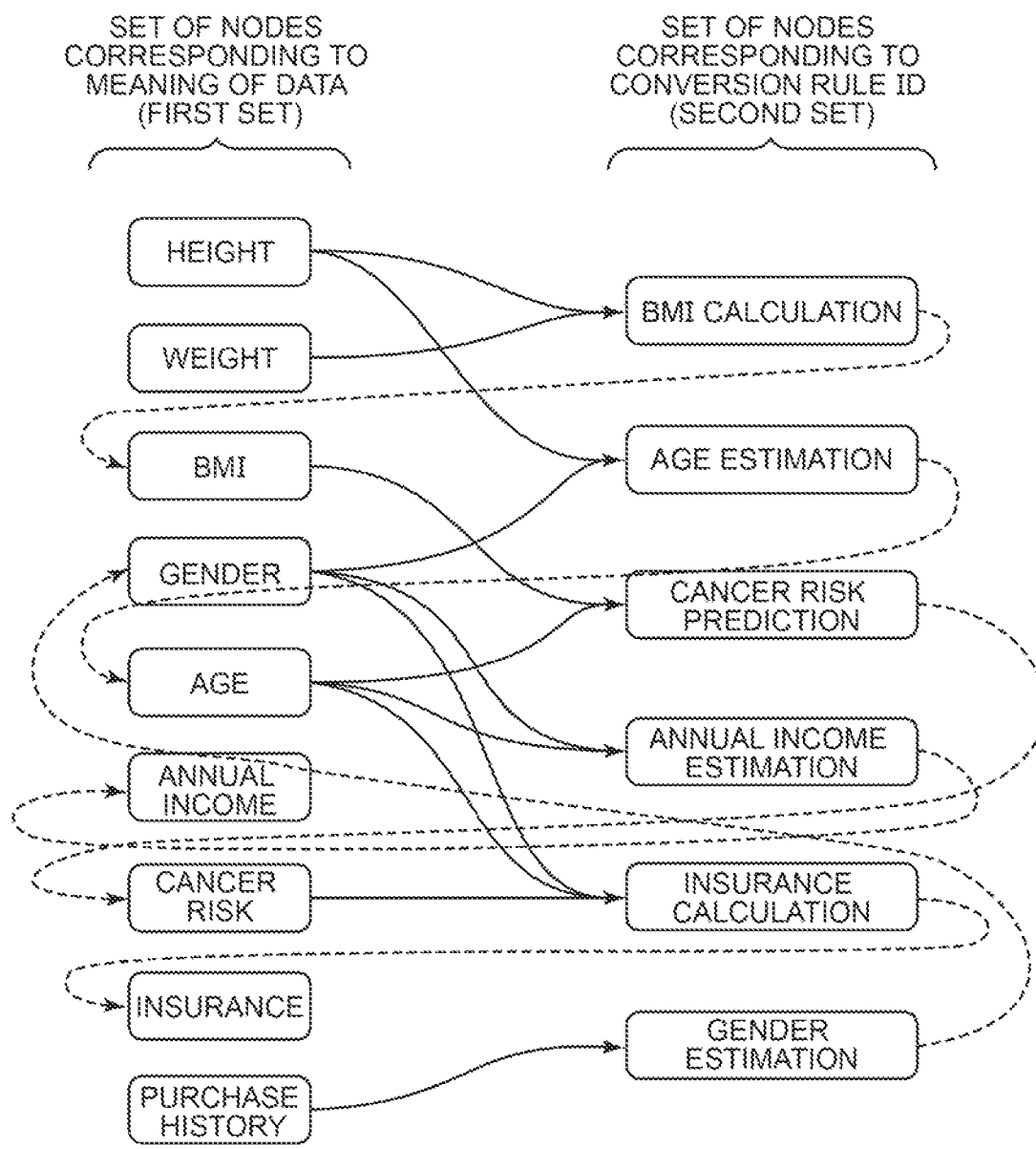
FIG. 6 It depicts an explanatory diagram showing an example of a directed bipartite graph generated based on each of the conversion rules shown in FIG. 5.

Based on each conversion rule stored in the conversion rule storage unit 5 in advance, the graph generation unit 7 generates a directed bipartite graph that includes a set of nodes representing a meaning of data and a set of nodes representing a conversion rule ID. In the second example embodiment, the case in which the conversion rule storage unit 5 stores the six conversion rules illustrated in FIG. 5 is used as an example. FIG. 6 is an explanatory diagram showing an example of a directed bipartite graph generated based on each of the conversion rules shown in FIG. 5.

An example of the operation in which the graph generation unit 7 generates a directed bipartite graph is shown below. However, the graph generation unit 7 may generate a directed bipartite graphs in other ways.

The graph generation unit 7 selects one unselected conversion rule from each conversion rule stored in the conversion rule storage unit 5. The graph generation unit 7 generates a node representing the meaning of data on the left side of the selected conversion rule and a node representing the meaning of data on the right side of the selected conversion rule, and includes those nodes in the first set of nodes. The graph generation unit 7 also generates a node representing the conversion rule ID of the selected conversion rule and includes the node in the second set of nodes.

The first set of nodes is the set of nodes corresponding to the meaning of data, and the second set of nodes is the set of nodes corresponding to the conversion rule ID. Then, the graph generation unit 7 generates edges from each of the nodes corresponding to the meaning of data on the left side of the selected conversion rule to the node corresponding to the conversion rule ID of the selected conversion rule. Furthermore, the graph generation unit 7 generates edges from each of the nodes corresponding to the conversion rule ID of the selected conversion rule to each of the nodes corresponding to the meaning of data on the right side of the selected conversion rule.

For example, assuming that the conversion rule "BMI CALCULATION" shown in FIG. 5 is selected. In this case, the graph generation unit 7 generates a node corresponding to "height", a node corresponding to "weight", and a node corresponding to "BMI", and includes them in the first set of nodes. The graph generation unit 7 also generates a node corresponding to "BMI CALCULATION" and includes it in the second set of nodes. Then, the graph generation unit 7 generates edges from each of the nodes corresponding to "height" and "weight" to the node corresponding to "BMI CALCULATION". Furthermore, the graph generation unit 7 generates an edge from the node corresponding to "BMI CALCULATION" to the node corresponding to "BMI".

The graph generation unit 7 selects conversion rules one by one and executes the above process until there are no more unselected conversion rules. However, when a node corresponding to the meaning of data to be newly generated has already been generated, the graph generation unit 7 does not need to generate that node in duplicate. For example, consider the case where the conversion rule "CANCER RISK PREDICTION" is selected after the conversion rule "BMI CALCULATION" is selected and the above process is executed. When the conversion rule "CANCER RISK PREDICTION" is selected, the graph generation unit 7 generates a node corresponding to "BMI," a node corresponding to "age," and a node corresponding to "cancer risk" as nodes corresponding to the meaning of data, but the node corresponding to "BMI" has already been generated. Therefore, in this case, the graph generation unit 7 does not need to generate a node corresponding to "BMI" in duplicate.

An example of a directed bipartite graph generated in this way is shown in FIG. 6. In FIG. 6, the edge from the node corresponding to the meaning of data to the node corresponding to the conversion rule ID is shown as a solid line. The edge from the node corresponding to the conversion rule ID to the node corresponding to the meaning of data is shown as dashed line. In other words, the edges from the nodes in the first set to the nodes in the second set are shown as solid lines, and the edges from the nodes in the second set to the nodes in the first set are shown as dashed lines.

The graph generation unit 7 stores the generated directed bipartite graph in the graph storage unit 8. The graph storage unit 8 is a storage device that stores the generated directed bipartite graph.

The analysis unit 26 defines each node corresponding to the given meaning of data as a search start point.

The analysis unit 26 then repeats the following process.

In the directed bipartite graph, the analysis unit 26 identifies a node corresponding to the conversion rule ID that is reached from the search start point via one edge.

When each node corresponding to the "meaning of data" on the left side of the conversion rule represented by the conversion rule ID corresponding to the identified node is all search start point, and the identified node is reached from all of these search start points, the analysis unit 26 derives a search route from these search start points to the node representing the meaning of data on the right side of the conversion rule.

The analysis unit 26 then determines the node representing the meaning of data on the right side described above as the search start point.

The analysis unit 26 determines the search routes that have been derived up to the time when it is no longer possible to derive new search routes, as information indicating what kind of analysis can be performed.

The graph generation unit 7 and the analysis unit 26 are realized by the CPU of the computer operating according to the analysis program, for example. The graph storage unit 8 is realized, for example, by the storage device provided by the computer.

Figure 7:
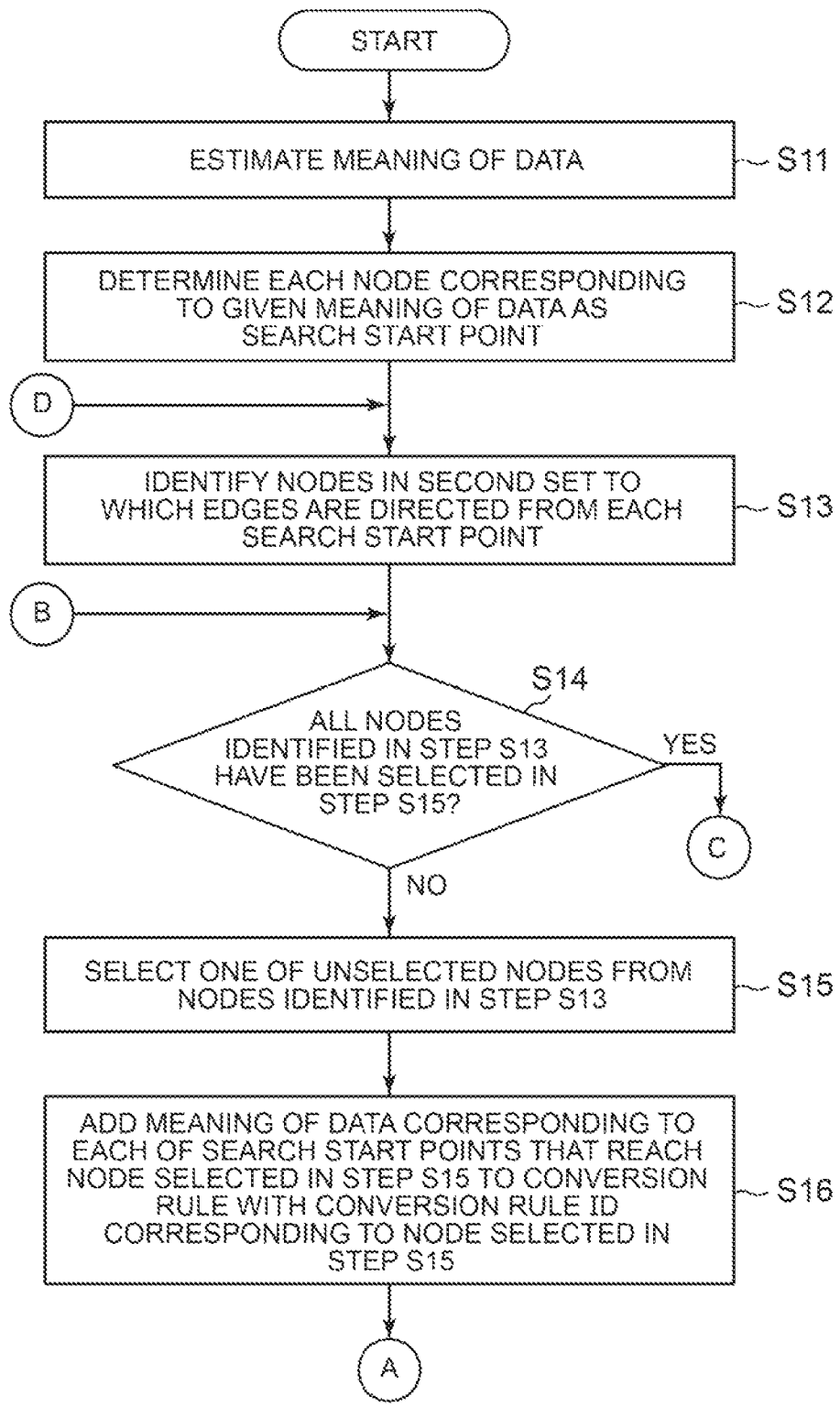
FIG. 7 It depicts a flowchart showing an example of the processing flow of the second example embodiment.
Figure 8:
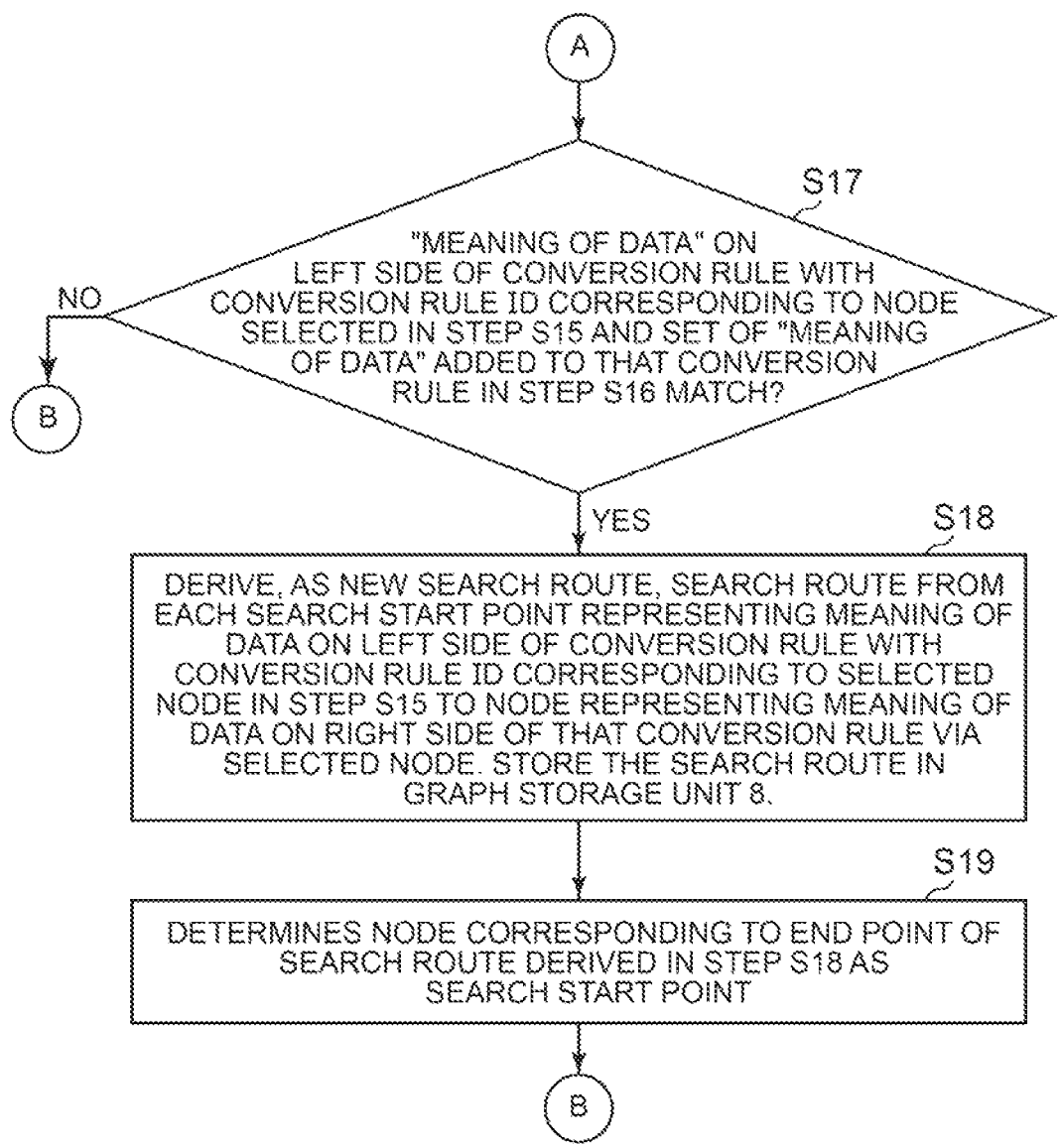
FIG. 8 It depicts a flowchart showing an example of the processing flow of the second example embodiment.
Figure 9:
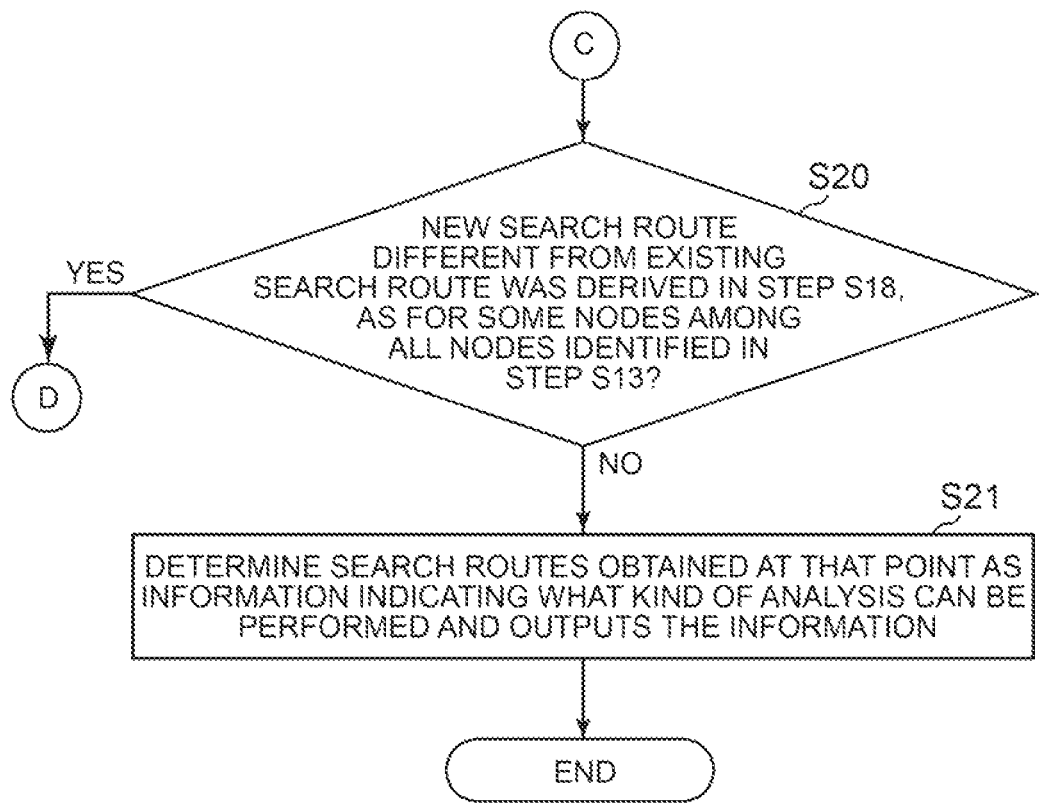
FIG. 9 It depicts a flowchart showing an example of the processing flow of the second example embodiment.

Next, the processing flow of the second example embodiment will be described. FIG. 7, FIG. 8, and FIG. 9 are flowcharts showing an example of the processing flow of the second example embodiment. However, a detailed explanation of the matters already explained will be omitted.

It is assumed that the conversion rule storage unit 5 stores each conversion rule shown in FIG. 5 in advance. The graph generation unit 7 has already generated the directed bipartite graph shown in FIG. 6 based on the conversion rules, and stores the directed bipartite graph in the graph storage unit 8. It is also assumed that the acquisition unit 2 has acquired the data (table).

First, the meaning estimation unit 3 estimates the meaning of data acquired by the acquisition unit 2 (step S11). For each column of the table, the meaning estimation unit 3 estimates the meaning of data stored in the column. In step S11, one or more meanings of data are obtained. Hereafter, the meaning of data obtained in step S11 is denoted as the given meaning of data. In this example, it is assumed that the given meanings of data are {"height", "weight", "annual income", "age"}.

Next, the analysis unit 26 determines each node corresponding to the given meaning of data in the directed bipartite graph that has been generated in advance as a search start point (step S12). This node belongs to the first set in the directed bipartite graph. The analysis unit 26 stores the meaning of data corresponding to the search start point in the meaning storage unit 4. The number of search start points is not necessarily one.

In this example, it is assumed that the respective nodes corresponding to "height", "weight", "annual income", and "age" are the search start points.

Next, the analysis unit 26 identifies the nodes in the second set in the directed bipartite graph to which edges are directed from each search start point (step S13). The number of nodes identified in step S13 is not necessarily one. The nodes identified in step S13 can be said to be nodes that are reached via one edge from the search start point.

In this example, since the respective nodes corresponding to "height", "weight", "annual income", and "age" are the search start points, in step S13, nodes corresponding to "BMI CALCULATION", "AGE ESTIMATION", "CANCER RISK PREDICTION", "ANNUAL INCOME ESTIMATION", and "INSURANCE CALCULATION" are identified.

Next, the analysis unit 26 determines whether all the nodes identified in step S13 have been selected in step S15 (step S14).

When any of the nodes identified in step S13 remain that have not been selected in step S15 (No in step S14), then the process moves to step S15.

In step S15, the analysis unit 26 selects one of the unselected nodes from the nodes identified in step S13.

Next, the analysis unit 26 adds the meaning of data corresponding to each of the search start points that reach the node selected in step S15 to the conversion rule with the conversion rule ID corresponding to the node selected in step S15 (step S16). Assuming that when the conversion rule ID is represented as "r", the meaning of data at the search start point that reaches the node corresponding to that conversion rule ID is expressed as "r.visited_semantics". Assuming that the conversion rule ID corresponding to the selected node is "r", in step S16, the analysis unit 26 adds the specific meaning of data to "r.visited_semantics."

Next to step S16, the analysis unit 26 determines whether the "meaning of data" on the left side of the conversion rule with the conversion rule ID corresponding to the node selected in step S15 and the set of the "meaning of data" added to that conversion rule in step S16 match or not (step S17). Assuming that the conversion rule ID corresponding to the selected node is "r", in step S17, the analysis unit 26 may determine whether "r.input_semantics" and the set of the "meaning of data" added to "r.visited_semantics" match or not.

The fact that it is determined to match in step S17 (Yes in step S17) means that each node corresponding to the "meaning of data" before conversion in the conversion rule with the conversion rule ID corresponding to the selected node is a search start point, and that the selected node has been reached from all of the search start points.

When it is determined not to match in step S17 (No in step S17), analysis unit 26 repeats the process from step S14 (see FIG. 7) onward.

When it is determined to match in step S17 (Yes in step S17), the analysis unit 26 derives, as a new search route, a search route from each search start point representing the meaning of data on the left side of the conversion rule with the conversion rule ID corresponding to the selected node in step S15 to the node representing the meaning of data on the right side of that conversion rule via the selected node. Then, the analysis unit 26 stores the search route in the graph storage unit 8 (step S18). However, the analysis unit 26 does not need to store the same search route in the graph storage unit 8 in duplicate as the search route that has already been derived.

Figure 10:
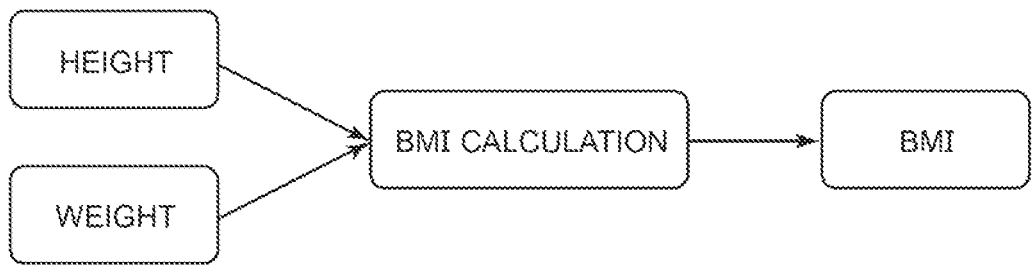
FIG. 10 It depicts a schematic diagram showing an example of a search route derived in step S18.

FIG. 10 is a schematic diagram showing an example of a search route derived in step S18.

Next to step S18, the analysis unit 26 determines the node corresponding to the end point of the search route derived in step S18 as the search start point (step S19). In other words, a new search start point is added to the existing search start point in step S19. For example, when the search route shown in FIG. 10 is derived in step S18, the analysis unit 26 adds a node representing the meaning of data "BMI" that corresponds to the end point of the search route to the existing search start point as a new search start point. The analysis unit 26 stores the meaning of data corresponding to the search start point determined in step S19 (in other words, the newly added search start point) in the meaning storage unit 4.

After step S19, the analysis unit 26 repeats the process from step S14 (see FIG. 7) onward.

After moving to step S14, when it is determined that all the nodes identified in step S13 have been selected in step S15 (Yes in step S14), then the process moves to step 20 (see FIG. 9).

In step S20, the analysis unit 26 determines whether a new search route different from the existing search route was derived or not in step S18, as for some nodes among all nodes identified in step S13 (step S20).

When a new search route has been derived in step S18 as for some nodes among all nodes identified in step S13 (Yes in step S20), the analysis unit 26 repeats the process from step S13 (see FIG. 7) onward.

When no new search route has been derived in step S18 for any of the nodes identified in step S13 (No in step S20), the analysis unit 26 determines the search routes obtained at the time as information indicating what kind of analysis can be performed and outputs the information (step S21). The process ends at step S21.

Figure 11:
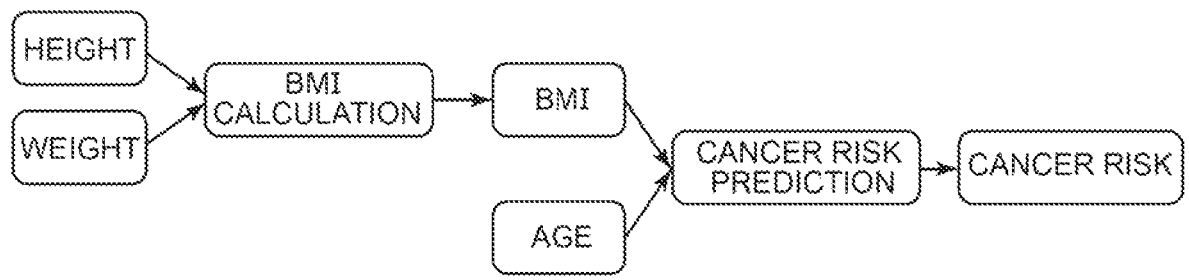
FIG. 11 It depicts a schematic diagram showing an example of the final search route.

FIG. 11 is a schematic diagram showing an example of the final search route obtained in this example.

According to the second example embodiment, as shown in FIG. 11, a search route based on nodes corresponding to the given meaning of data is obtained. The nodes corresponding to the conversion rule IDs are included in the search route. Therefore, as in the first example embodiment, it is possible to present what kind of analysis can be performed using the data in the user's possession. Furthermore, in the second example embodiment, information indicating what kind of analysis can be performed is derived in the form of a search route, so it is possible to present not only what kind of analysis can be performed, but also the analysis procedure, i.e., what kind of procedure is used to perform the analysis. For example, when the search route illustrated in FIG. 11 is presented, the user can understand that by performing BMI CALCULATION and then CANCER RISK PREDICTION, "cancer risk" can be obtained.

Although FIG. 11 shows a search route such that the endpoint is only "cancer risk," the search route may branch out and a search route with multiple endpoints may be obtained. Such a search route represents the fact that multiple types of analysis can be performed, and the meaning of data obtained for each of those analyses. This is also the case in the third example embodiment described below.

Example Embodiment 3

Figure 12:
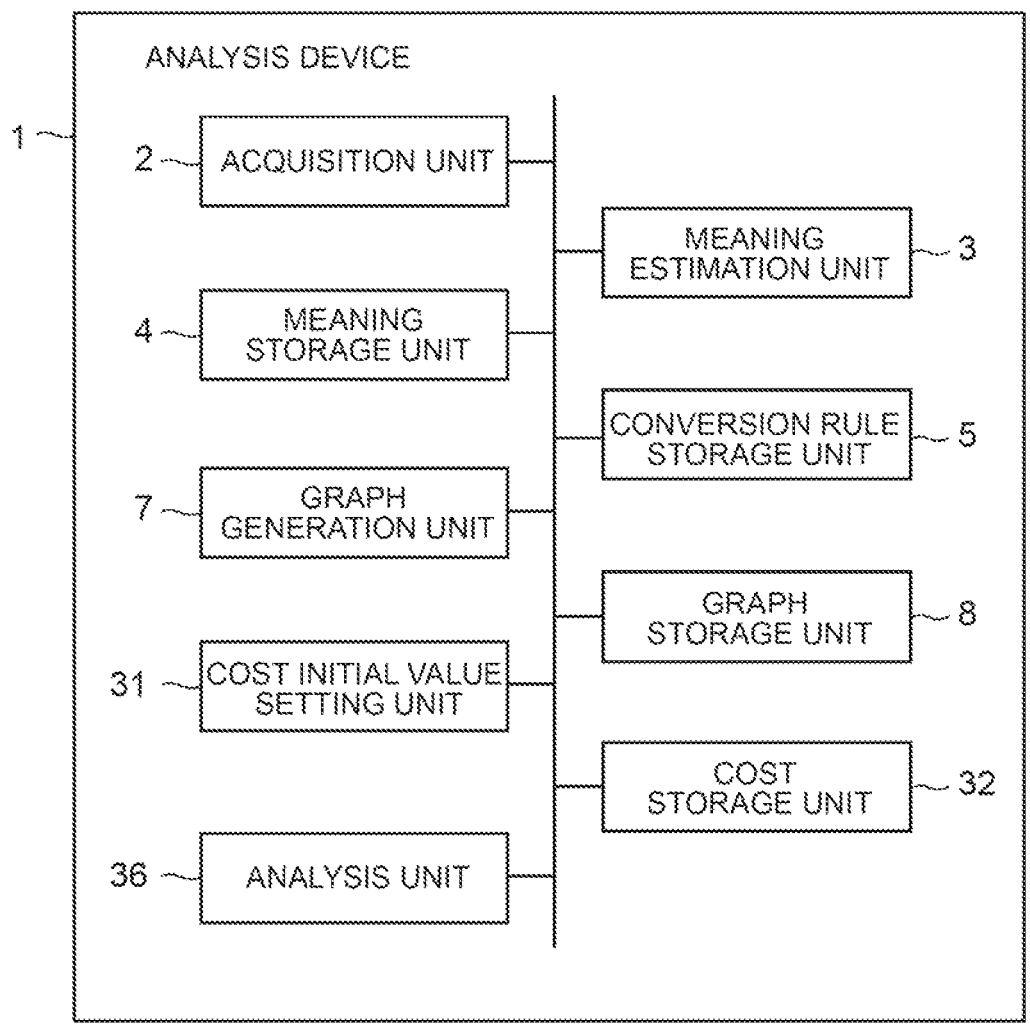
FIG. 12 It depicts a block diagram showing an example of an analysis device of the third example embodiment of the present invention.

FIG. 12 is a block diagram showing an example of an analysis device of the third example embodiment of the present invention. The analysis device 1 of the present embodiment includes an acquisition unit 2, a meaning estimation unit 3, a meaning storage unit 4, a conversion rule storage unit 5, a graph generation unit 7, a graph storage unit 8, a cost initial value setting unit 31, a cost storage unit 32, and an analysis unit 36.

In the third example embodiment, a cost is set for each individual "meaning of data" corresponding to an individual node belonging to the first set of directed bipartite graphs. A cost is also predetermined for each conversion rule. In addition, an cost upper limit (hereinafter referred to as max_cost) is predetermined for the user who gives data (the data holder). It can be said that max_cost represents the upper limit of the budget for the available conversion rules (in other words, the available analysis processes). max_cost can be also referred to as a predetermined cost upper limit.

Hereinafter, "meaning of data" may be denoted as "$s_i$" and the cost of the meaning of data may be denoted as "$s_i.cost$". The conversion rule ID of a conversion rule may be denoted as "r" and the cost of the conversion rule may be denoted as "$r.cost$".

The acquisition unit 2, the meaning estimation unit 3, the meaning storage unit 4, and conversion rule storage unit 5 in the third example embodiment are the same as the acquisition unit 2, the meaning estimation unit 3, the meaning storage unit 4, and conversion rule storage unit 5 in the first example embodiment and the second example embodiment, and the explanation is omitted. However, in the present embodiment, each conversion rule stored in the conversion rule storage unit 5 has a cost individually defined in advance.

The graph generation unit 7 and the graph storage unit 8 in the third example embodiment are the same as the graph generation unit 7 and the graph storage unit 8 in the second example embodiment, and the explanation is omitted.

The cost initial value setting unit 31 sets an initial value of the cost for each meaning of data corresponding to each node belonging to the first set of directed bipartite graphs. In this case, the cost initial value setting unit 31 sets the cost of the given meaning of data (in other words, the meaning of data estimated by the meaning estimation unit 3) to "0", and sets the cost of the remaining meanings of data to infinity.

The cost storage 32 is a storage device that stores a combination of meaning of data and cost for each meaning of data.

The analysis unit 36 derives the search route from the search start point based on the cost of the meaning of data, the cost predetermined for each conversion rule, and max_cost.

Specifically, the analysis unit 36 defines each node corresponding to the given meaning of data as a search start point.

The analysis unit 36 then repeats the following process.

In a directed bipartite graph, the analysis unit 36 identifies, in each node corresponding to a conversion rule ID to which one edge is directed from the search start point, only node that satisfies a condition that the sum of the cost of the meaning of data corresponding to the search start point and the cost of the conversion rule represented by the conversion rule ID is equal to or less than max_cost, as a node that is reached via one edge from the search start point. Therefore, in the third example embodiment, only when the condition that the sum of the cost of the meaning of data corresponding to the search start point ($s_i.cost$) and the cost of the conversion rule ($r.cost$) is equal to or less than max_cost is satisfied, the node corresponding to conversion rule ID of the conversion rule is identified as a node that is reached via one edge from the search start point.

Then, when all nodes each corresponding to "meaning of data" on the left side of the conversion rule represented by the conversion rule ID corresponding to the identified node are search start points and the identified node is reached from all of the search start points, the analysis unit 36 derives a search route from those search start points to the node that represents the meaning of data on the right side of the conversion rule.

The analysis unit 36 then determines the node representing the meaning of data on the right side described above as the search start point. At this time, the analysis unit 36 updates the cost of the meaning of data corresponding to the search start point when the predetermined condition is satisfied. The predetermined condition is a condition that a sum of the cost of the conversion rule represented by the last conversion rule ID on the derived search route and the sum total of the costs of respective meanings of data corresponding to all search start points that reach the node corresponding to the conversion rule ID is equal to or less than the cost of the meaning of data corresponding to the newly determined search start point. When this condition is satisfied, the analysis unit 36 updates the cost of the meaning of data corresponding to the newly determined search start point with the value of the above sum. When this condition is not satisfied, the analysis unit 36 does not update the cost of the meaning of data corresponding to the newly determined search start point.

The analysis unit 36 determines the search routes that have been derived up to the time when it is no longer possible to derive new search routes as information indicating what analysis can be performed.

The cost initial value setting unit 31 and the analysis unit 36 are realized, for example, by the CPU of the computer operating according to the analysis program. The cost storage unit 32 is realized, for example, by the storage device provided by the computer.

Figure 13:
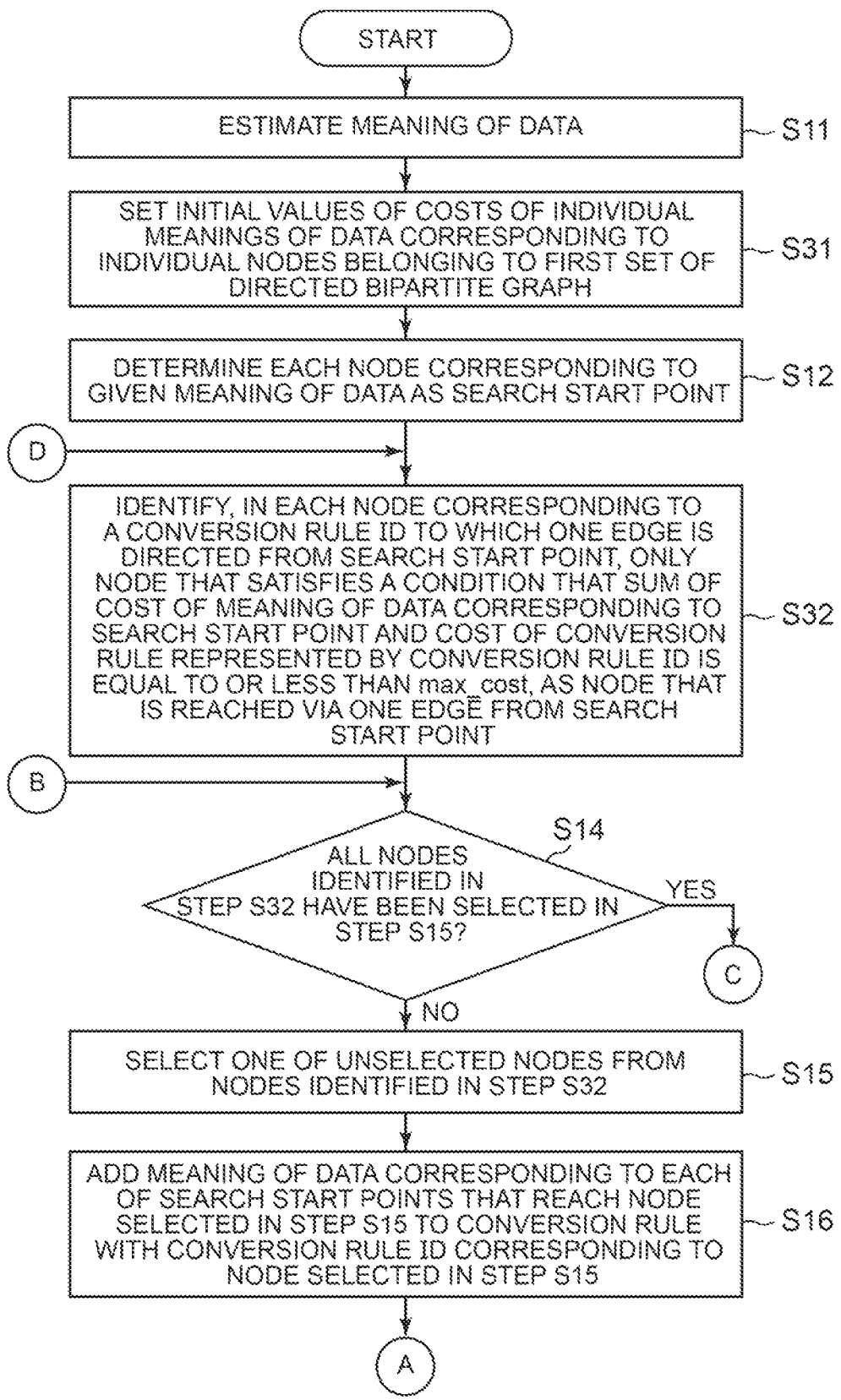
FIG. 13 It depicts a flowchart showing an example of the processing flow of the third example embodiment.
Figure 14:
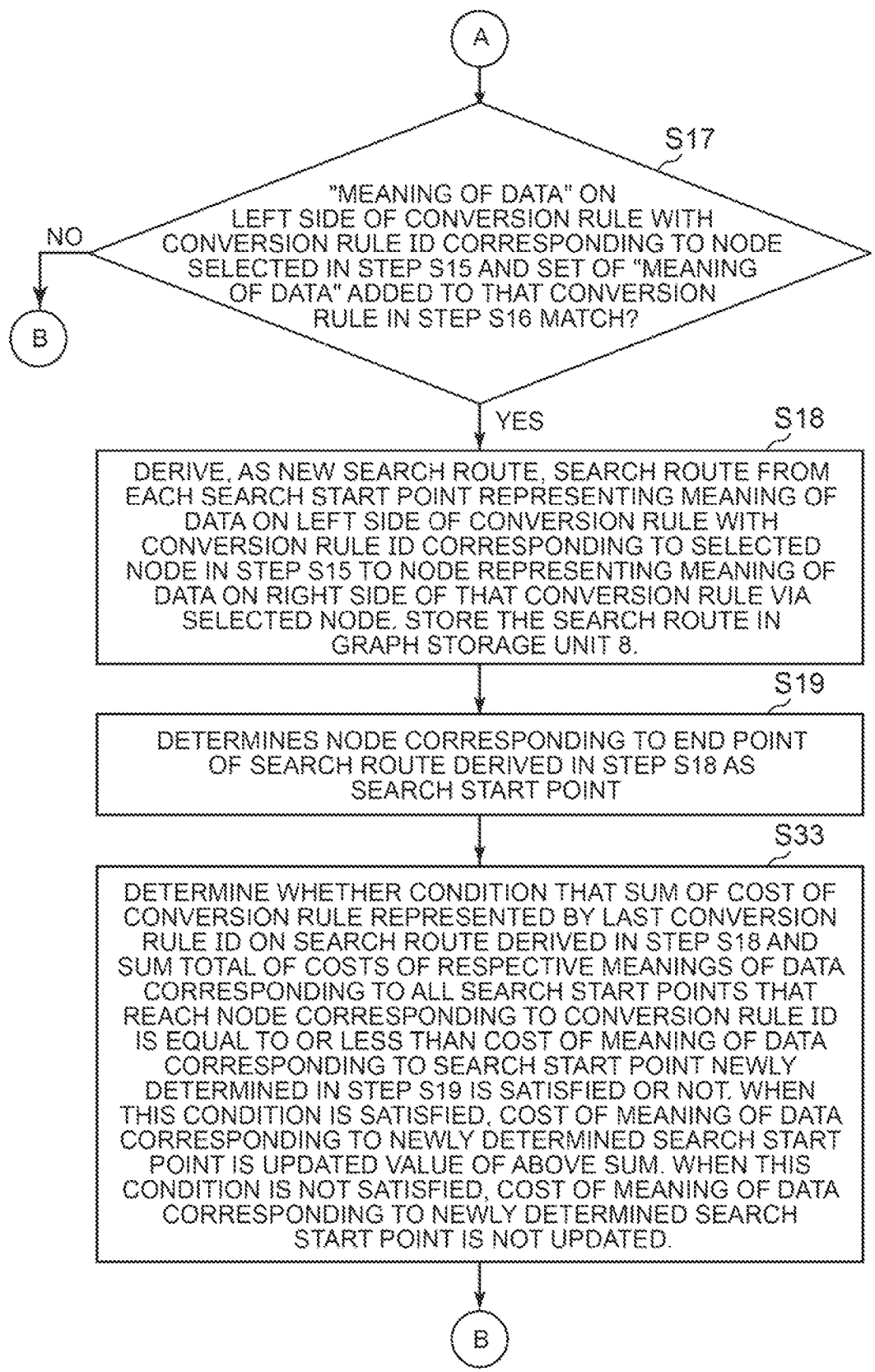
FIG. 14 It depicts a flowchart showing an example of the processing flow of the third example embodiment.
Figure 15:
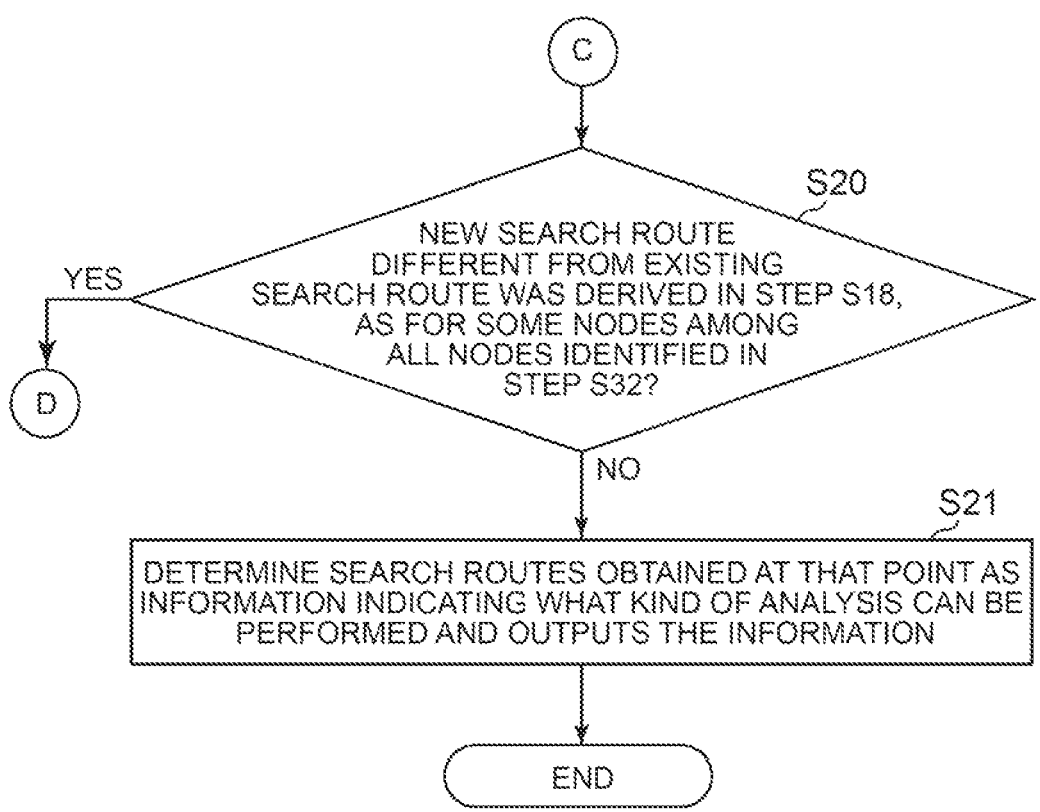
FIG. 15 It depicts a flowchart showing an example of the processing flow of the third example embodiment.

Next, the processing flow of the third example embodiment will be described. FIG. 13, FIG. 14, and FIG. 15 are flowcharts showing an example of the processing flow of the third example embodiment. However, a detailed explanation of the matters already explained will be omitted. The same step numbers as those of in FIG. 7, FIG. 8, and FIG. 9 are used for the same processes as in the second example embodiment, and detailed explanations are omitted.

It is assumed that the conversion rule storage unit 5 stores each conversion rule illustrated in FIG. 5 in advance. However, the conversion rules "BMI CALCULATION," "AGE ESTIMATION," "CANCER RISK PREDICTION," "ANNUAL INCOME ESTIMATION," "INSURANCE CALCULATION," and "GENDER ESTIMATION" have costs of "5", "10", "20", "20", "12", and 9" are assumed to be predetermined. The value of max_cost is also assumed to be predetermined.

It is assumed that the graph generation unit 7 has already generated the directed bipartite graph shown in FIG. 6 based on each of the conversion rules, and stores the directed bipartite graph in the graph storage unit 8. It is also assumed that the acquisition unit 2 has acquired the data (table).

First, the meaning estimation unit 3 estimates the meaning of data acquired by the acquisition unit 2 (step S11). Hereafter, the meaning of data obtained in step S11 is referred to as the given meaning of data. In this example, it is assumed that the given meaning of is {"height", "weight", "annual income", "age"}.

Figure 16:
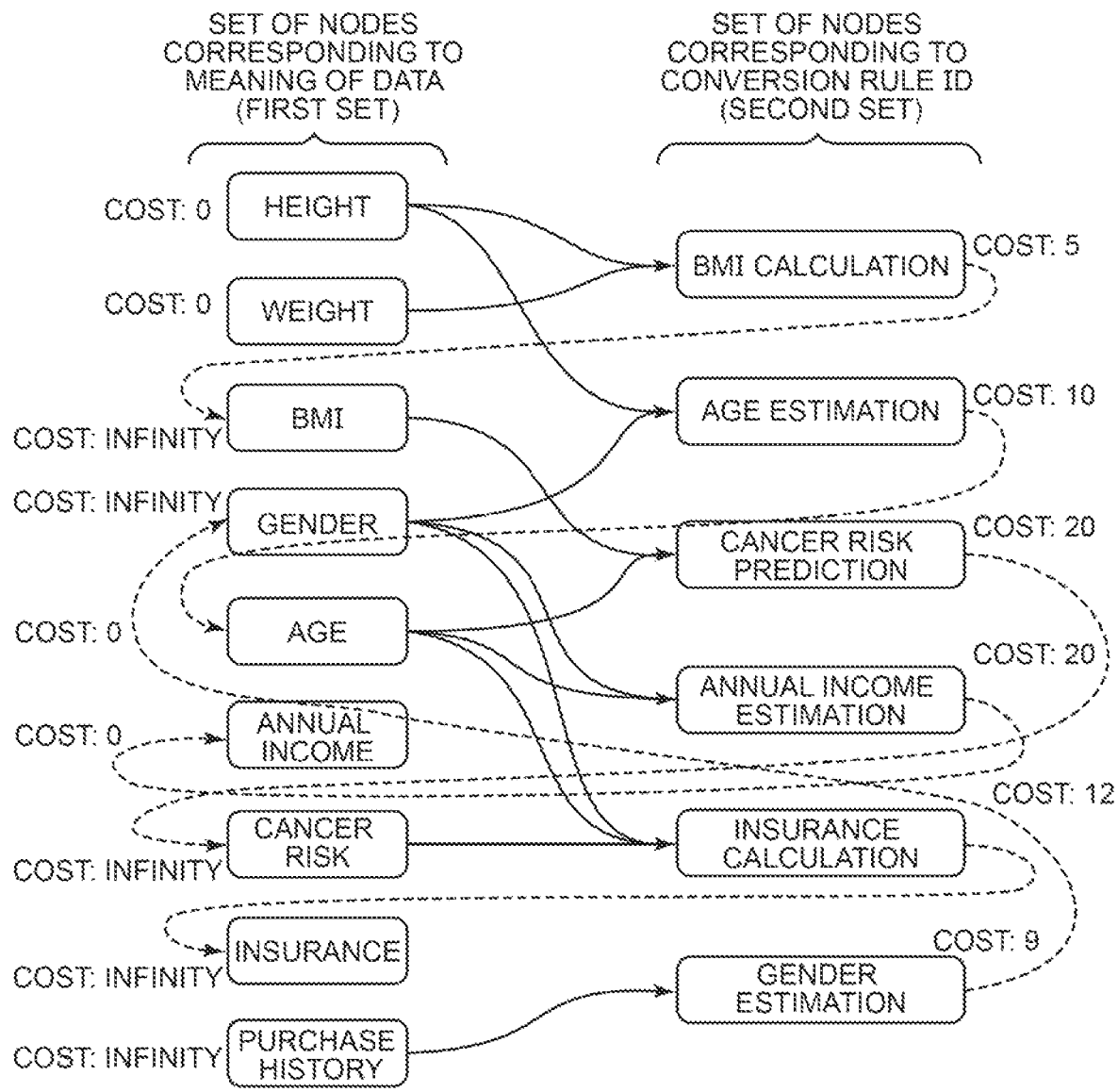
FIG. 16 It depicts a schematic diagram showing costs set in step S31 together with a directed bipartite graph.

In the third example embodiment, next to step S11, the cost initial value setting unit 31 sets the initial values of the costs of the individual meanings of data corresponding to the individual nodes belonging to the first set of the directed bipartite graph (step S31). Specifically, the cost initial value setting unit 31 sets the costs of the given meanings of data {"height," "weight," "annual income," "age"} to 0, respectively, and sets the costs of the remaining meanings of data to infinity. FIG. 16 is a schematic diagram showing costs set in step S31 together with a directed bipartite graph. FIG. 16 also shows predefined costs of the conversion rules.

In step S31, the cost initial value setting unit 31 stores the combination of the meaning of data and the cost in the cost storage unit 32 for each meaning of data.

Next to step S31, the analysis unit 36 determines each node corresponding to the given meaning of data in the directed bipartite graph as a search start point (Step S12). In this example, the respective nodes corresponding to "height", "weight", "annual income", and "age" are determined as the search start points.

Then, the analysis unit 36 identifies, in each node corresponding to a conversion rule ID to which one edge is directed from the search start point, only node that satisfies a condition that the sum of the cost of the meaning of data corresponding to the search start point and the cost of the conversion rule represented by the conversion rule ID is equal to or less than max_cost, as node that is reached via one edge from the search start point. (Step S32).

For example, the explanation is focusing on "height" and "BMI CALCULATION". The node corresponding to "height" is the search start point. The cost of "height" is "0" and the cost of the conversion rule "BMI CALCULATION" is "5" (see FIG. 16). In other words. "height.cost=0" and "BMI CALCULATION.cost=5". Thus, when the value of ""height.cost"+"BMI CALCULATION.cost"" is equal to or less than max_cost, the node corresponding to "BMI CALCULATION" is identified as the node to be reached via one edge from the search start point corresponding to "height". When the value of ""height.cost"+"BMI CALCULATION.cost"" is greater than max_cost, the node corresponding to "BMI CALCULATION" is not identified as the node to be reached via one edge from the search start point corresponding to "height".

When, in step S32, no node is identified that is reached from the search start point via one edge, the search route obtained at the time is determined as information that indicates what kind of analysis can be performed, the information is output, and the process ends.

Next to step S32, the analysis unit 36 performs step S14 and onward. The operations of steps S14 to S19 are the same as the operations of steps S14 to S19 in the second example embodiment, and the explanation is omitted. However, in step 14, the analysis unit 36 determines whether all the nodes identified in step S32 have been selected in step S15. Also, in step S15, the analysis unit 36 selects one of the unselected nodes from the nodes identified in step S32

After step S19, the analysis unit 36 determines whether the condition that the sum of the cost of the conversion rule represented by the last conversion rule ID on the search route derived in step S18 and the sum total of the costs of respective meanings of data corresponding to all search start points that reach the node corresponding to the conversion rule ID is equal to or less than the cost of the meaning of data corresponding to the search start point newly determined in step S19 is satisfied or not. When this condition is satisfied, the analysis unit 36 updates the cost of the meaning of data corresponding to the newly determined search start point with the value of the above sum. When this condition is not satisfied, the analysis unit 36 does not update the cost of the meaning of data corresponding to the newly determined search start point (step S33).

Figure 17:
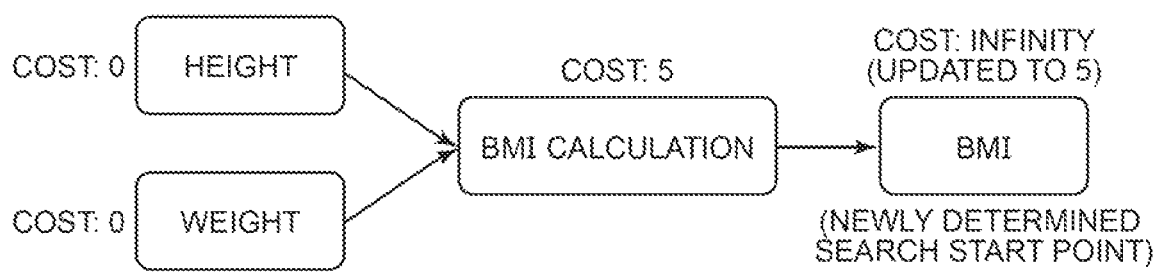
FIG. 17 It depicts a schematic diagram showing an example of a search route derived in step S18.

For example, it is assumed that in step S18, the search route shown in FIG. 17 is derived. In this case, the last conversion rule ID on the search route is "BMI CALCULATION" and the cost of the conversion rule "BMI CALCULATION" is "5". All search start points that reach the node corresponding to "BMI CALCULATION" are the search start point corresponding to "height" and the search start point corresponding to "weight". Since the cost of "height" and the cost of "weight" are both "0", their sum total is also "0". Therefore, the sum of the cost "5" of the conversion rule "BMI CALCULATION" and the above sum total "0" is "5".

In the search route shown in FIG. 17, the search start point corresponding to "BMI" is the newly determined search start point. The cost of "BMI" is infinite. Therefore, since the above sum "5" is equal to or less than the cost "infinity" of "BMI". Therefore, the condition in step S33 is satisfied. Therefore, the analysis unit 36 updates the cost of "BMI" from "infinity" to the above sum "5".

If the cost of "BMI" is "4", then the condition in step S33 is not satisfied. In this case, the analysis unit 36 does not update the cost of "BMI" and leaves the cost at "4".

When updating the cost of the meaning of data, the analysis unit 36 may update the cost of the meaning of data stored in the cost storage unit 32.

After step S33, the analysis unit 36 repeats the process from step S14 (FIG. 13) onward.

Step S20 and step S21 are the same as step S20 and step S21 in the second example embodiment, and the explanation is omitted. However, in step S20, the analysis unit 36 determines whether a new search route different from the existing search route was derived or not in step S18, as for some nodes among all nodes identified in step S32.

In the third example embodiment, the same effects as in the second example embodiment are obtained. Furthermore, in the third example embodiment, the length of the search route obtained is different according to the value of max_cost. In other words, in the third example embodiment, the search route whose length is according to the value of max_cost is obtained. This means, for example, that it is possible to present an analysis that can be performed within the budget of the data holder.

In the above example, for example, if max_cost is "2", no search route is obtained and the process ends. In the above example, if max_cost is "15", for example, the search route shown in FIG. 10 is derived and the process ends. In the above example, if max_cost is "30", for example, the search route shown in FIG. 11 is derived and the process ends. In this way, in the third example embodiment, a search route with a length according to the value of max_cost is obtained.

As described in the second example embodiment, the search route may branch out and a search route with multiple end points may be obtained.

In the second example embodiment and the third example embodiment, when there is data that the person having data wants to obtain through analysis, the meaning of data may be specified. Then, the analysis unit 26 of the second example embodiment and the analysis unit 36 of the third example embodiment may obtain a search route that branches out and has multiple end points, after that, extract only search route whose end point is corresponds to the specified meaning of data, and output the search route.

Next, variations of each example embodiment will be described. In each example embodiment of the present invention, the analysis device 1 may not be provided with a meaning estimation unit 3. In that case, the acquisition unit 2 may directly acquire the meaning of data possessed by the user. In other words, the acquisition unit 2 may acquire one or more "meanings of data" directly from an external source. In this case, the "meaning of data" may be treated as the "given meaning of data" in each of the above example embodiments.

Figure 18:
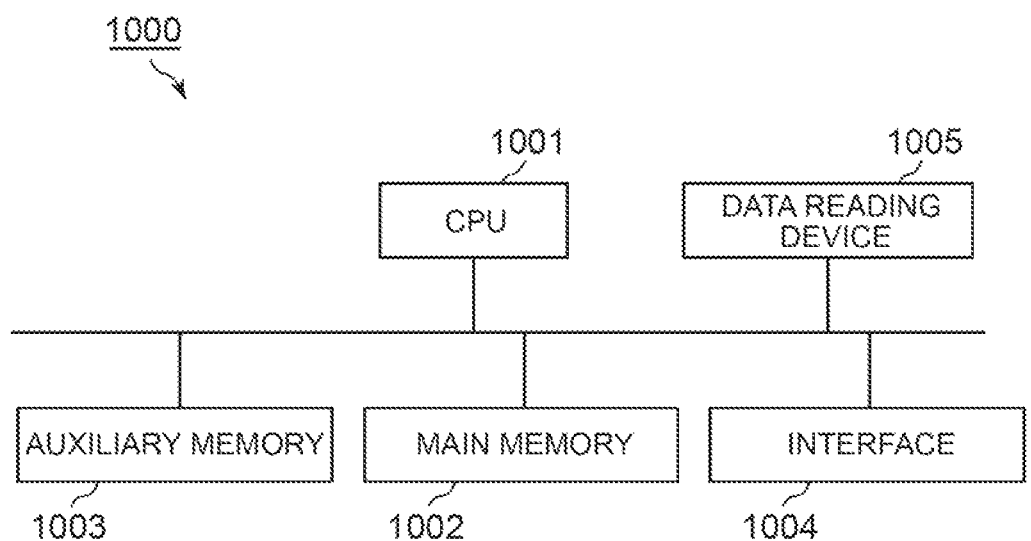
FIG. 18 It depicts a schematic block diagram showing an example of computer configuration of the analysis device of each example embodiment of the present invention.

FIG. 18 is a schematic block diagram showing an example of computer configuration of the analysis device 1 of each example embodiment of the present invention. For example, the computer 1000 includes a CPU 1001, a main memory 1002, an auxiliary memory 1003, an interface 1004, and a data reading device 1005 that reads data (a table).

The analysis device 1 of each example embodiment of the present invention is realized by the computer 1000. The operation of the analysis device 1 is stored in the auxiliary memory 1003 in the form of a program (an analysis program). The CPU 1001 reads the program from the auxiliary memory 1003, expands the program to the main memory 1002, and then executes the processes described in above each example embodiment according to the program.

The auxiliary memory 1003 is an example of a non-transitory tangible medium. Other examples of non-transitory tangible media include magnetic disks connected via interface 1004, magneto-optical disks, CD-ROM (Compact Disk Read Only Memory), DVD-ROM (Digital Versatile Disk Read Only Memory), semiconductor memory, etc. When the program is delivered to the computer 1000 through a communication line, the computer 1000 may expand the program in the main memory 1002 and execute the process described in the above each example embodiment according to the program.

Some or all of the components may be realized by general purpose or dedicated circuitry, processor, or a combination of these. These may comprise a single chip or multiple chips connected via a bus. Some or all of the components may be realized by a combination of the above-mentioned circuitry, etc. and a program.

When some or all of components is realized by multiple information processing devices, circuits, etc., the multiple information processing devices, circuits, etc. may be centrally located or distributed. For example, the information processing devices and circuits may be realized as a client-and-server system, a cloud computing system, etc., each of which is connected via a communication network.

Figure 19:
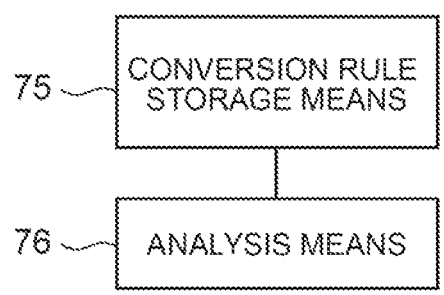
FIG. 19 It depicts a block diagram showing an overview of the analysis device of the present invention.

Next, an overview of the invention will be described. FIG. 19 is a block diagram showing an overview of the analysis device of the present invention. The analysis device of the present invention includes conversion rule storage means 75 and analysis means 76.

The conversion rule storage means 75 (e.g., the conversion rule storage unit 5) stores multiple conversion rules for converting one or more meanings of data to other one or more meanings of data.

The analysis means 76 (e.g., the analysis unit 6, the analysis unit 26, or the analysis unit 36) derives, based on one or more given meanings of data and the conversion rules, information indicating what kind of analysis can be performed using the data with the meaning.

According to such a configuration, it is possible to derive information indicating what kind of analysis can be performed using the data in one's possession.

The configuration may be as follows.

The analysis device further comprises graph generation means (e.g., the graph generation unit 7) for generating, based on each conversion rule, a directed bipartite graph that includes a set of nodes representing meanings of data and a set of nodes representing conversion rule IDs, wherein the analysis means 76 (e.g., the analysis unit 26)

determines each node corresponding to the one or more given meanings of data as a search start point, repeats an operation including:

identifying a node corresponding a conversion rule ID that is reached from the search start point via one edge in the directed bipartite graph;

when all nodes eache corresponding to meaning of data before conversion in a conversion rule represented by the conversion rule ID corresponding to the identified node are search start points, and the identified node is reached from all of the search start points, deriving a search route to a node representing meaning of data after conversion in the conversion rule; and determining the node representing meaning of data after conversion as a search start point; and determines the search route that have been derived up to the time when it is no longer possible to derive new search route, as information indicating what kind of analysis can be performed.

The configuration may be as follows.

A cost is predetermined for respective conversion rules, and the analysis device further comprises graph generation means (e.g., the graph generation unit 7) for generating, based on each conversion rule, a directed bipartite graph that includes a set of nodes representing meanings of data and a set of nodes representing conversion rule IDs; and cost initial value setting means 76 (e.g., the cost initial value setting unit 31) for setting an initial value of the cost for respective meanings of data in the directed bipartite graph, wherein the analysis means (e.g., the analysis unit 36)

determines each node corresponding to the one or more given meanings of data as a search start point, repeats an operation including:

identifying, in nodes corresponding to conversion rule IDs to which one edge is directed from the search start point, only node that satisfies a condition that a sum of the cost of the meaning of data corresponding to the search start point and the cost of the conversion rule represented by the conversion rule ID is equal to or less than a predetermined cost upper limit, as node that is reached via one edge from the search start point, when all nodes each corresponding to meaning of data before conversion in a conversion rule represented by the conversion rule ID corresponding to the identified node are search start points, and the identified node is reached from all of the search start points, deriving a search route to a node representing meaning of data after conversion in the conversion rule; and determining the node representing meaning of data after conversion as a search start point, and updating the cost of the meaning of data corresponding to the node when a predetermined condition is satisfied; and determines the search route that have been derived up to the time when it is no longer possible to derive new search route, as information indicating what kind of analysis can be performed.

The cost initial value setting means may set the cost of one or more given meanings of data to 0, and sets the cost of remaining meanings of data to infinity, wherein when a sum of the cost of the conversion rule represented by last conversion rule ID on the derived search route and a sum total of the costs of respective meanings of data corresponding to all search points that reach the node corresponding to the conversion ID is equal to or less than the cost of the meaning of data after conversion in the conversion rule, the analysis means 76 (e.g., the analysis unit 36) may update the cost of the meaning of data with the sum.

the analysis means 76 (e.g., the analysis unit 36)

may repeat operations including:

extracting a conversion rule that satisfies a condition that the meaning of data before conversion is encompassed by the one or more given meanings of data;

obtaining a union set of the meaning data after conversion in the extracted conversion rule and the one or more given meanings of data, and considering the union set as the one or more given meanings of data:

wherein when the extracted conversion rule is identical to previously extracted conversion rule, the analysis means 76 defines a set of extracted conversion rule, as the information.

The analysis device may be configured to include meaning estimation means (e.g., the meaning estimation unit 3) for estimating the meaning of data when data is given.

Although the present invention has been described above with reference to example embodiments, the present invention is not limited to the above example embodiments. Various changes may be made to the structure and details of the present invention, that may be understood by those skilled in the art within the scope of the present invention.

INDUSTRIAL APPLICABILITY

The present invention is suitably applicable to analysis device that analyzes what analysis can be performed with given meaning of data.

REFERENCE SIGNS LIST

1 Analysis device
2 Acquisition unit
3 Meaning estimation unit
4 Meaning storage unit
5 Conversion rule storage unit
6, 26, 36 Analysis unit
7 Graph generation unit
8 Graph storage unit
31 Cost initial value setting unit
32 Cost storage unit

What is claimed is:

1. An analysis device comprising:
a processor; and
a memory storing instructions executable by the processor to:
store conversion rules for converting meanings of data to other meanings of data;
generate, based on the conversion rules, a directed bipartite graph that includes a set of first nodes representing the meanings of data and a set of second nodes representing conversion rule IDs for the conversion rules;
determine search start points by identifying the first nodes in the directed bipartite graph respectively corresponding to given meanings of input data;
iteratively perform processing comprising:
identifying the second nodes in the directed bipartite graph that are reached from all the search start points via edges in the directed bipartite graph;
deriving search routes respectively corresponding to the identified second nodes;
redetermining the search start points by identifying the first nodes in the directed bipartite graph that are reached after conversion using the conversion rules corresponding to the conversion rule IDs of the identified second nodes;
determine the search routes that have been derived as information indicating what kinds of analyses can be performed using the given meanings of the input data,
wherein the processing is iteratively performed until no second nodes are reached from all the redetermined search start points and accordingly no search routes respectively corresponding to the identified second nodes are derivable.

2. The analysis device according to claim 1, wherein the instructions are executable by the processor to further:
the given meanings of the input data.

3. An analysis method performed by a computer and comprising:
storing conversion rules for converting meanings of data to other meanings of data;
generating, based on the conversion rules, a directed bipartite graph that includes a set of first nodes representing the meanings of data and a set of second nodes representing conversion rule IDs for the conversion rules;
determining search start points by identifying the first nodes in the directed bipartite graph respectively corresponding to given meanings of input data;
iteratively performing processing comprising:
- identifying the second nodes in the directed bipartite graph that are reached from all the search start points via edges in the directed bipartite graph;
- deriving search routes respectively corresponding to the identified second nodes;
- redetermining the search start points by identifying the first nodes in the directed bipartite graph that are reached after conversion using the conversion rules corresponding to the conversion rule IDs of the identified second nodes;

determining the search routes that have been derived as information indicating what kinds of analyses can be performed using the given meanings of the input data,
wherein the processing is iteratively performed until no second nodes are reached from all the redetermined search start points and accordingly no search routes respectively corresponding to the identified second nodes are derivable.

4. A non-transitory computer-readable recording medium storing an analysis program that causes a computer to execute:
storing conversion rules for converting meanings of data to other meanings of data;
generating, based on the conversion rules, a directed bipartite graph that includes a set of first nodes representing the meanings of data and a set of second nodes representing conversion rule IDs for the conversion rules;
determining search start points by identifying the first nodes in the directed bipartite graph respectively corresponding to given meanings of input data;
iteratively performing processing comprising:
- identifying the second nodes in the directed bipartite graph that are reached from all the search start points via edges in the directed bipartite graph;
- deriving search routes respectively corresponding to the identified second nodes;
- redetermining the search start points by identifying the first nodes in the directed bipartite graph that are reached after conversion using the conversion rules corresponding to the conversion rule IDs of the identified second nodes;

determining the search routes that have been derived as information indicating what kinds of analyses can be performed using the given meanings of the input data,
wherein the processing is iteratively performed until no second nodes are reached from all the redetermined search start points and accordingly no search routes respectively corresponding to the identified second nodes are derivable.

* * * * *